(12) United States Patent
Ueyama (10) Patent No.: US 8,823,882 B2
(45) Date of Patent: Sep. 2, 2014

(54) BACKLIGHT DEVICE, DISPLAY DEVICE, AND TELEVISION RECEIVER

(75) Inventor: Munetoshi Ueyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/127,855

(22) PCT Filed: Jun. 15, 2012

(86) PCT No.: PCT/JP2012/065316
§ 371 (c)(1),
(2), (4) Date: Dec. 19, 2013

(87) PCT Pub. No.: WO2012/176697
PCT Pub. Date: Dec. 27, 2012

(65) Prior Publication Data
US 2014/0125874 A1 May 8, 2014

(30) Foreign Application Priority Data
Jun. 23, 2011 (JP) .................... 2011-139491

(51) Int. Cl.
*H04N 3/14* (2006.01)
*H04N 5/64* (2006.01)

(52) U.S. Cl.
CPC ............... *G02B 6/0088* (2013.01); *H04N 5/64* (2013.01); *G02F 2201/503* (2013.01); *G02B 6/0043* (2013.01); *G02B 6/0035* (2013.01); *G02B 6/0055* (2013.01)
USPC ........................................ 348/790

(58) Field of Classification Search
USPC ................. 348/790, 791, 794, 801–803, 836
See application file for complete search history.

(56) References Cited

U.S. PATENT DOCUMENTS

| | | | |
|---|---|---|---|
| 8,223,195 B2 * | 7/2012 | Kuroki et al. | 348/51 |
| 8,523,420 B2 * | 9/2013 | Baek et al. | 362/616 |
| 2012/0140519 A1 * | 6/2012 | Sakai | 362/608 |
| 2013/0021818 A1 * | 1/2013 | Baek et al. | 362/602 |
| 2013/0057805 A1 * | 3/2013 | Minoura et al. | 349/62 |
| 2013/0093965 A1 * | 4/2013 | Ishimoto | 348/744 |
| 2013/0308343 A1 * | 11/2013 | Baek et al. | 362/613 |

FOREIGN PATENT DOCUMENTS

| | | |
|---|---|---|
| JP | 2002-324421 A | 11/2002 |
| WO | 2011/158553 A1 | 12/2011 |

* cited by examiner

*Primary Examiner* — Paulos M Natnael
(74) *Attorney, Agent, or Firm* — Chen Yoshimura LLP (57) ABSTRACT

A backlight device (3) is provided with: a reflective sheet (8) that reflects light from a light guide plate (7) back towards the light guide plate (7); a bottom (opposing surface) (10a) that is arranged so as to face the reflective sheet (8) on the side of the reflective sheet (8) opposite to the light guide plate (7) and that has a prescribed squeezing part (a part with recesses and protrusions) (10a1) formed thereon; and a cushioning member (9) arranged between the reflective sheet (8) and the bottom (10a). The cushioning member (9) has an opening (9a) at a location that corresponds to the squeezing part (10a1).

14 Claims, 11 Drawing Sheets

BACKLIGHT DEVICE, DISPLAY DEVICE, AND TELEVISION RECEIVER

TECHNICAL FIELD

The present invention relates to a backlight device, and particularly to a backlight device using a light guide plate, a display device using this backlight device, and a television receiver.

BACKGROUND ART

In recent television receivers for household use, for example, display devices that are provided with a liquid crystal panel as a front display unit are becoming the norm, as exemplified by liquid crystal display devices, with many advantages over conventional cathode-ray tubes, such as being thinner and lighter. Such liquid crystal display devices are provided with a backlight device that emits light and a liquid crystal panel that displays desired images by acting as a shutter for light from light sources provided on the backlight device. In television receivers, information such as characters, images, and the like included in image signals from television broadcasts are displayed on the display surface of the liquid crystal panel.

Backlight devices are largely divided into either direct-lit types or edge-lit types depending on the arrangement of light sources with respect to the liquid crystal panel, which is the object to be illuminated, but recent liquid crystal display devices commonly use edge-lit types, which are easier to make thinner than direct-lit types. In other words, an edge-lit backlight device is made thinner by arranging the light sources on a side of the liquid crystal panel, and a light guide plate provided with a light exiting surface (a light emitting surface) facing the non-display surface of the liquid crystal panel is used to provide light to the liquid crystal panel from the light sources.

In such an edge-lit backlight device as described above, light diffusing parts such as bumps that have prescribed patterns are provided in the light guide plate with respect to the non-light exiting surface, which is disposed so as to face the light exiting surface, in order to emit light towards the liquid crystal panel while guiding light from the light sources in a prescribed direction. In these backlight devices, a reflective sheet is provided so as to face the non-light exiting surface of the light guide plate in order to increase the usage efficiency of light emitted from the light sources, and light that goes outside the non-light exiting surface is reflected back towards the light guide plate.

In liquid crystal display devices such as those described above, a printed circuit substrate with electronic components mounted thereon for driving the liquid crystal panel, or a printed circuit substrate with electronic components mounted thereon for driving the light sources of the backlight device is usually attached to the outside of the bottom of the backlight device casing (external vessel) in order to make the liquid crystal display device more compact.

However, the reflective sheet and light guide plate are sequentially placed inside the backlight device casing. Thus, in such a backlight device, problems sometimes occurred such as uneven brightness leading to a reduction of light emitting quality. Specifically, in such a backlight device, a squeezing part (a part with recesses and protrusions) for attaching the printed circuit substrate described above is provided on the casing, and thus, sometimes slight level differences occurred at the base portion of this squeezing part, and this level difference pushed the reflective sheet inside the casing towards the light guide plate. This caused the reflective sheet to damage the light guide plate, especially in flat portions of the light guide plate where the light diffusing parts are not provided, and light progressing through the light guide plate was completely reflected by these damaged portions of the light guide plate and emitted towards the liquid crystal panel (the object to be illuminated). The result was that sometimes uneven brightness (uneven whiteness) occurred in which parts of the illumination light for the liquid crystal panel were brighter than other parts, causing a reduction in the light emitting quality of the backlight device and a reduction in display quality of the liquid crystal display device.

To address this, a configuration is proposed, as disclosed in Patent Document 1 below, for example, in which a large number of protective dots made of a resin are formed on the surface of the reflective sheet near the light guide plate in a conventional backlight device. In this conventional backlight device, the protective dots can prevent the light guide plate from being damaged even if the reflective sheet is pushed towards the light guide plate.

RELATED ART DOCUMENT

Patent Document

Patent Document 1: Japanese Patent Application Laid-Open Publication No. 2002-324421

SUMMARY OF THE INVENTION

Problems to be Solved by the Invention

However, in such a conventional backlight device as described above, it is not possible to prevent the reflective sheet damaging the light guide plate depending on the shape of the squeezing part, the size and placement location of the dots, the operating environment of the liquid crystal display device, and the like. Thus, there was a problem that uneven brightness and a reduction in light emitting quality could not be prevented.

Specifically, in this conventional backlight device, the light guide plate, reflective sheet, and casing contracted and expanded with mutually different sizes due to the surrounding temperature, heat generated by the light sources, electronic components, and the like at the time of operation, and the like. In this conventional backlight device, this made it not possible to prevent the light guide plate from being damaged by the reflective sheet being pushed towards the light guide plate by a level difference (a few dozen μm, for example) at the base portion of the squeezing part (the part with recesses and protrusions).

In particular, it became difficult to prevent uneven brightness and a reduction in light emitting quality in this conventional backlight device when the light guide plate was made thinner, namely, when a light guide plate that is susceptible to being damaged was used in response to demands for a thinner liquid crystal display device.

The present invention was made in view of the above-mentioned problems and aims at providing a backlight device that can prevent a reduction in light emitting quality even if a light guide plate is made thinner, a display device that uses this backlight device, and a television receiver.

Means for Solving the Problems

To achieve the above-mentioned goals, a backlight device of the present invention includes: a light source;

a light guide plate that guides light from the light source in a prescribed propagation direction and that emits the light to an object to be illuminated;

a reflective sheet that is disposed on a side of the light guide plate that is opposite to the object to be illuminated and that reflects light from the light guide plate back towards the light guide plate;

an opposing surface that is arranged so as to oppose the reflective sheet on a side of the reflective sheet that is opposite to the light guide plate, the opposing surface having prescribed recesses and protrusions formed thereon; and a cushioning member that is arranged between the reflective sheet and the opposing surface, wherein openings are formed in the cushioning member at locations corresponding to the recesses and protrusions.

In the backlight device configured as above, the cushioning member has openings formed at locations corresponding to the recesses and protrusions on the opposing surface. This allows the recesses and protrusions and the base portion thereof to prevent the reflective sheet from being pushed towards the light guide plate, and makes it possible to prevent damage to the surface of the light guide plate. As a result, a backlight device can be formed that can prevent a reduction in light emitting quality even if the light guide plate is made thinner, unlike in the conventional examples described above.

In the above-mentioned backlight device, it is preferable that a sheet material that is used as the cushioning member be the same sheet material as the reflective sheet.

In this case, it is possible to emit light from the light sources towards the object to be illuminated, and the brightness of the backlight device can be improved. Furthermore, the cushioning member, and by extension the backlight device can be manufactured with ease.

In the above-mentioned backlight device, it is preferable that the reflective sheet and the cushioning member be formed in mutual integration.

In this case, the assembly work of the backlight device can be simplified with ease.

In the above-mentioned backlight device, it is preferable that a metal vapor deposited film formed above the reflective sheet be used as the cushioning member.

In this case, an increase in the number of components of the backlight device can be prevented, and the assembly work of the backlight device can be simplified with ease.

In the above-mentioned backlight device, it is preferable that the cushioning member have a size in a direction perpendicular to the opposing surface of 0.02 mm or greater.

In this case, this allows the part with recesses and protrusions and the base portion thereof to reliably prevent the reflective sheet from being pushed towards the light guide plate, and makes it possible to reliably prevent damage to the surface of the light guide plate. Accordingly, a reduction in the light emitting quality can be reliably prevented even if the light guide plate is made thinner.

In the above-mentioned backlight device, it is preferable that the light guide plate have a light exiting surface that emits light to the object to be illuminated, and a non-light exiting surface that is opposite to the light exiting surface and that has light diffusing parts formed thereon that diffuse light, and that the light guide plate be a size in a direction perpendicular to the light exiting surface of 4 mm or less.

In this case, the backlight device can be made thinner with ease.

In the above-mentioned backlight device, it is preferable that an injection type light guide plate be used as the light guide plate.

In this case, a low-cost light guide plate can be used.

In the above-mentioned backlight device, it is preferable that the light diffusing parts in the light guide plate include a plurality of bumps, and that each of the plurality of bumps have an average height from the non-light exiting surface of 20 microns or less.

In this case, light from the light source can be suitably emitted to the object to be illuminated even if the light guide plate is made thinner.

In the above-mentioned backlight device, it is preferable that the light diffusing parts in the light guide plate be formed by performing printing on the non-light exiting surface.

In this case, the light diffusing parts can be formed with high precision, and a reduction in the light emitting quality of the backlight device can be prevented.

In the above-mentioned backlight device, it is preferable that a casing be provided that houses at least the light guide plate, the reflective sheet, and the cushioning member, and that the opposing surface be formed by a bottom of the casing.

In this case, a backlight device that has a small number of components and that is compact can be made with ease.

In the above-mentioned backlight device, it is preferable that a light emitting diode be used as the light source.

In this case, a backlight device that has low power consumption and excellent environmental characteristics can be made with ease.

A display device of the present invention uses any backlight device mentioned above.

A television receiver of the present invention uses the display device mentioned above.

In a display device and television receiver configured as above, a backlight device is used that can prevent a reduction in light emitting quality even if a light guide plate is made thinner, and thus, a high-performance display device and television receiver with excellent display quality can be made with ease.

Effects of the Invention

According to the present invention, it is possible to provide a backlight device that can prevent a reduction in light emitting quality even if a light guide plate is made thinner, a display device that uses this backlight device, and a television receiver.

DETAILED DESCRIPTION OF EMBODIMENTS

Preferable embodiments of the backlight device, display device, and television receiver of the present invention will be described below with reference to the drawings. In the descriptions below, using the present invention for a transmissive liquid crystal display device will be explained as an example. The dimensions of constituting members in respective figures do not truthfully represent the dimensions of actual constituting members, dimensional ratios of the respective constituting members, or the like.

Embodiment 1

Figure 1:
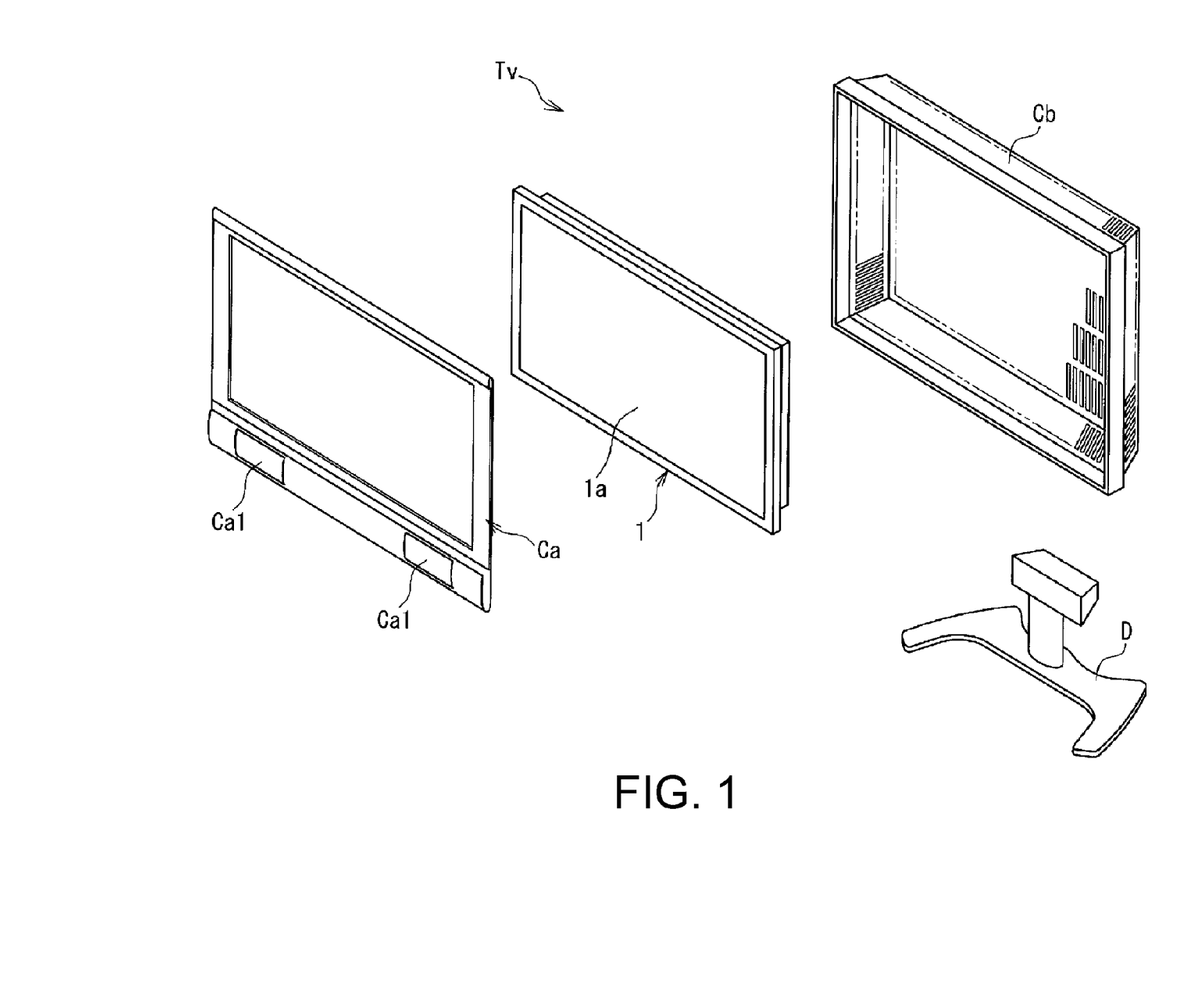
FIG. 1 is an exploded perspective view that shows a television receiver and liquid crystal display device according to Embodiment 1 of the present invention.

FIG. 1 is an exploded perspective view showing a television receiver and liquid crystal display device according to Embodiment 1 of the present invention. In the drawing, a television receiver Tv of the present embodiment is provided with a liquid crystal display device 1 as a display device, and can receive television broadcasts by an antenna, cable (not shown), or the like. The liquid crystal display device 1 is housed by a front cabinet Ca and a back cabinet Cb and is held upright by a stand D. In the television receiver Tv, a display surface 1a of the liquid crystal display device 1 is viewable via the front cabinet Ca. This display surface 1a is arranged by the stand D to be parallel to the exertion direction of gravity (the vertical direction).

In the television receiver Tv, display images are displayed on the display surface 1a in accordance with image signals from television broadcasts received by a TV tuner part (not shown), and sound is reproduced and outputted from a speaker Ca1 provided on the front cabinet Ca. A large number of vent holes are formed on the back cabinet Cb to be able to suitably dissipate heat generated by the backlight device, power source, and the like.

Next, the liquid crystal display device 1 of the present embodiment will be specifically described with reference to FIG. 2.

Figure 2:
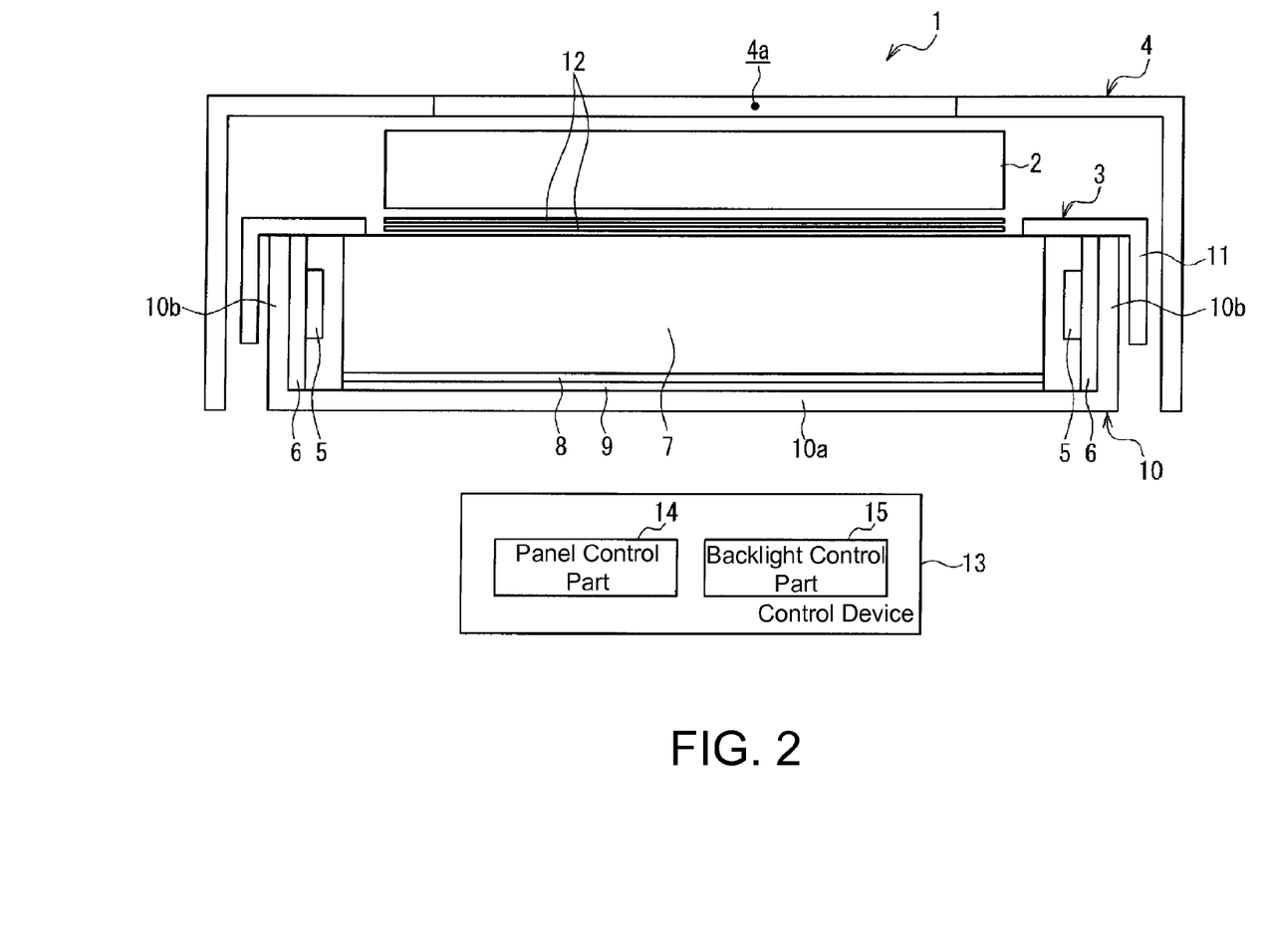
FIG. 2 is a view showing main components of the liquid crystal display device.

FIG. 2 is a view showing main components of the liquid crystal display device.

In FIG. 2, the liquid crystal display device 1 of the present embodiment includes a liquid crystal panel 2 disposed with the upper side of FIG. 2 as the viewing side (display surface side), and a backlight device 3 of the present invention disposed on the non-display side (lower side in FIG. 2) of the liquid crystal panel 2, the backlight device 3 emitting illumination light that illuminates the liquid crystal panel 2. In the liquid crystal display device 1, the liquid crystal panel 2 and backlight device 3 are attached together inside a bezel 4 that is L-shaped in a cross-sectional view. These are integrated to be the transmissive liquid crystal display device 1 in which illumination light from the backlight device 3 is incident on the liquid crystal panel 2.

In the liquid crystal display device 1, a control device 13 that controls driving of each part of the liquid crystal display device 1 is arranged on a side of the backlight device 3 (the back cabinet Cb side). This control device 13 includes a panel control part 14 that controls driving of the liquid crystal panel 2 and a backlight control part 15 that controls driving of the backlight device 3.

In the liquid crystal display device 1, the display surface 1a is defined by a rectangular opening 4a disposed on the bezel 4. In other words, in the liquid crystal display device 1, the display surface of the liquid crystal panel 2 that is visible through the opening 4a forms the display surface 1a.

A liquid crystal layer, a color filter substrate and an active matrix substrate as a pair of substrates that sandwich this liquid crystal layer, and polarizing plates that are arranged on the respective outer surfaces of the color filter substrate and active matrix substrate are disposed on the liquid crystal panel 2. In the liquid crystal panel 2, desired images are displayed by the liquid crystal layer modifying the polarization of illumination light entering via the polarizing plate on the backlight device 3 side, and by controlling the amount of light that passes through the polarizing plate on the opening 4a side (the display surface 1a side).

Next, the liquid crystal panel 2 of the present embodiment will be described in detail with additional reference to FIG. 3.

Figure 3:
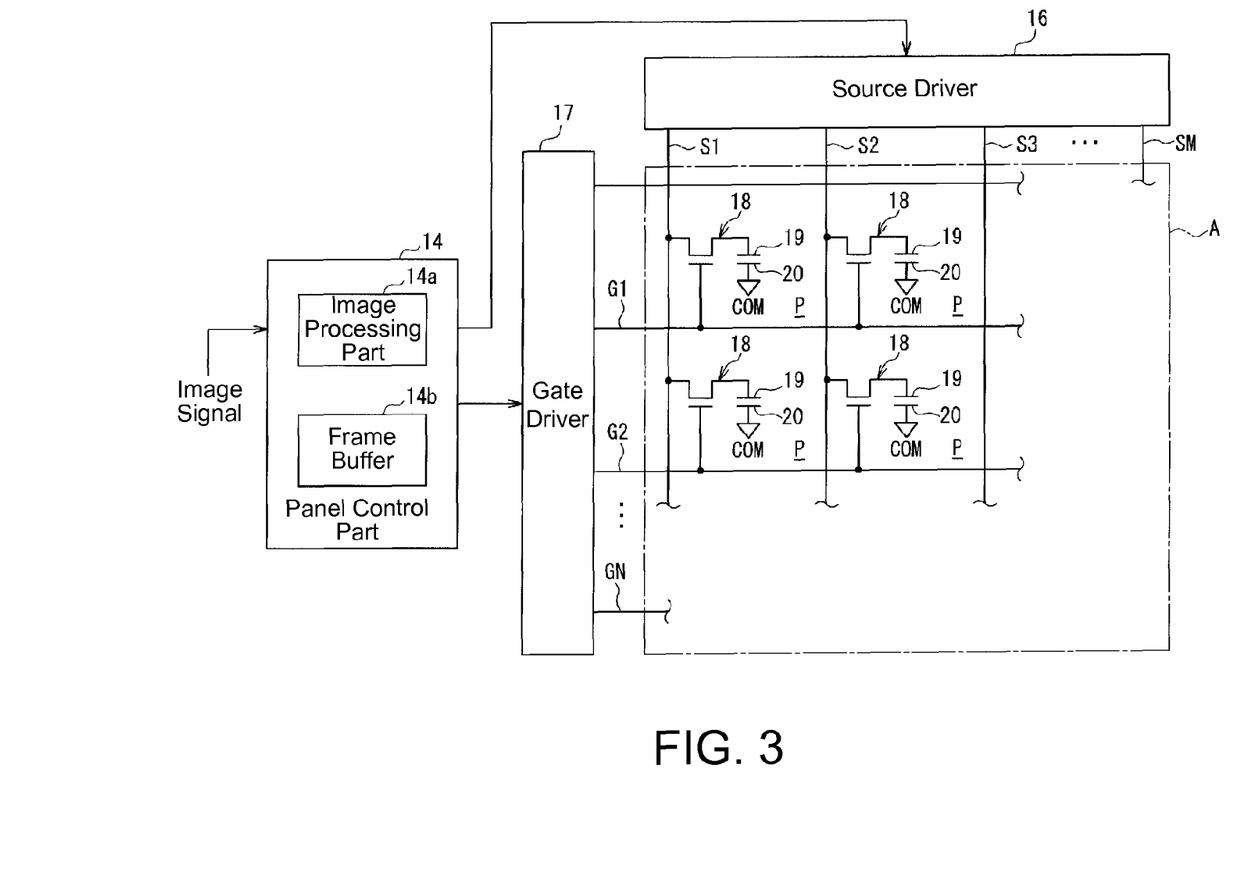
FIG. 3 is a view showing the configuration of the liquid crystal panel shown in FIG. 2.

FIG. 3 is a view showing a configuration of the liquid crystal panel shown in FIG. 2.

In FIG. 3, the liquid crystal display device 1 (FIG. 2) is provided with: the panel control part 14 that controls driving of the liquid crystal panel 2 (FIG. 2) as a display unit that displays information including characters, images, and the like; and a source 16 and gate driver 17 that operate on the basis of command signals from this panel control part 14.

The panel control part 14 is provided in the control device 13 (FIG. 2) inside the liquid crystal display device 1, and image signals from outside the liquid crystal display device 1 are inputted to the panel control part 14. The panel control part 14 includes an image processing part 14a that performs prescribed image processing of the inputted image signals and generates respective command signals for the source driver 16 and gate driver 17, and a frame buffer 14b that can store display data for every single frame included in the inputted image signals. The panel control part 14 controls driving of the source driver 16 and gate driver 17 in accordance with the inputted image signals in order to display the information corresponding to the image signals on the liquid crystal panel 2.

The source driver 16 and the gate driver 17 are disposed on the active matrix substrate, for example. Specifically, the source driver 16 is placed on the surface of the active matrix substrate along the horizontal direction of the liquid crystal panel 2, in an area outside an active display area A of the liquid crystal panel 2, which is a display panel. The gate driver 17 is placed on the surface of the active matrix substrate along the vertical direction of the liquid crystal panel 2, in an area outside the active display area A.

The source driver 16 and gate driver 17 are driving circuits that individually drive each of the plurality of pixels P disposed on the liquid crystal panel 2 side, and a plurality of source lines S1 to SM (where M is any integer of 2 or greater; hereinafter, "S") and a plurality of gate lines G1 to GN (where N is any integer of 2 or greater; hereinafter, "G") are respectively connected to the source driver 16 and gate driver 17. These source lines S and gate lines G are, respectively, data lines and scan lines, and are arrayed in a matrix so as to mutually intersect each other above a base substrate (not shown) made of a transparent glass material included in the active matrix substrate or made of a transparent compound resin. In other words, the source lines S are arranged on the base substrate so as to be parallel with the column direction (the vertical direction of the liquid crystal panel 2) of the matrix, and the gate lines G are arranged on the base material so as to be parallel with the row direction (the horizontal direction of the liquid crystal panel 2) of the matrix.

In the vicinity of the intersections of the source lines S and gate lines G, the pixels P having thin film transistors 18 as switching elements and pixel electrodes 19 connected to the thin film transistors 18 are provided. A common electrode 20 faces the pixel electrode 19 in each pixel P while the liquid crystal layer provided on the liquid crystal panel 2 is sandwiched therebetween. In other words, the thin film transistor 18, pixel electrode 19, and common electrode 20 are provided for each pixel in the active matrix substrate.

On the active matrix substrate, a plurality of pixel P regions are formed in the respective regions divided in a matrix by the source lines S and the gate lines G. Red (R), green (G), and blue (B) pixels are included among these plurality of pixels P. Also, these RGB pixels are sequentially arranged in this order, for example, in parallel with the respective gate lines G1 to GN. These RGB pixels are able to perform display of the corresponding color due to a color filter layer (not shown) provided on the color filter substrate side.

Also, in the active matrix substrate, the gate driver 17 sequentially outputs a scan signal (gate signal) that turns ON gate electrodes of the corresponding thin film transistors 18 to the gate lines G1 to GN on the basis of a command signal from the image processing part 14*a*. The source driver 16 outputs a data signal (voltage signal (gradation voltage)) based on the brightness (gradation) of the display image to the corresponding source lines S1 to SM on the basis of a command signal from the image processing part 14*a*.

Next, the backlight device 3 of the present embodiment will be explained in detail with reference to FIG. 2 and FIGS. 4 to 7.

Figure 4:
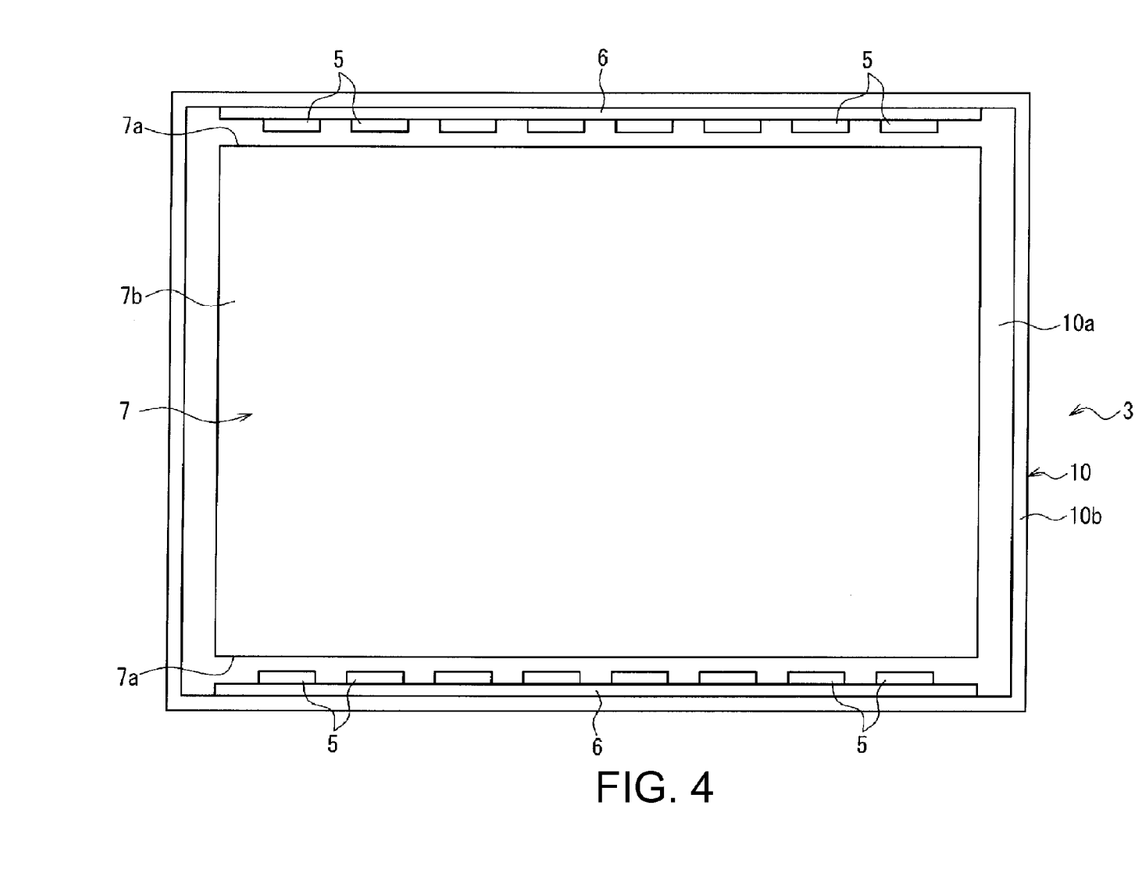
FIG. 4 is a plan view showing the backlight device shown in FIG. 2 as seen from the liquid crystal panel side.
Figure 5:
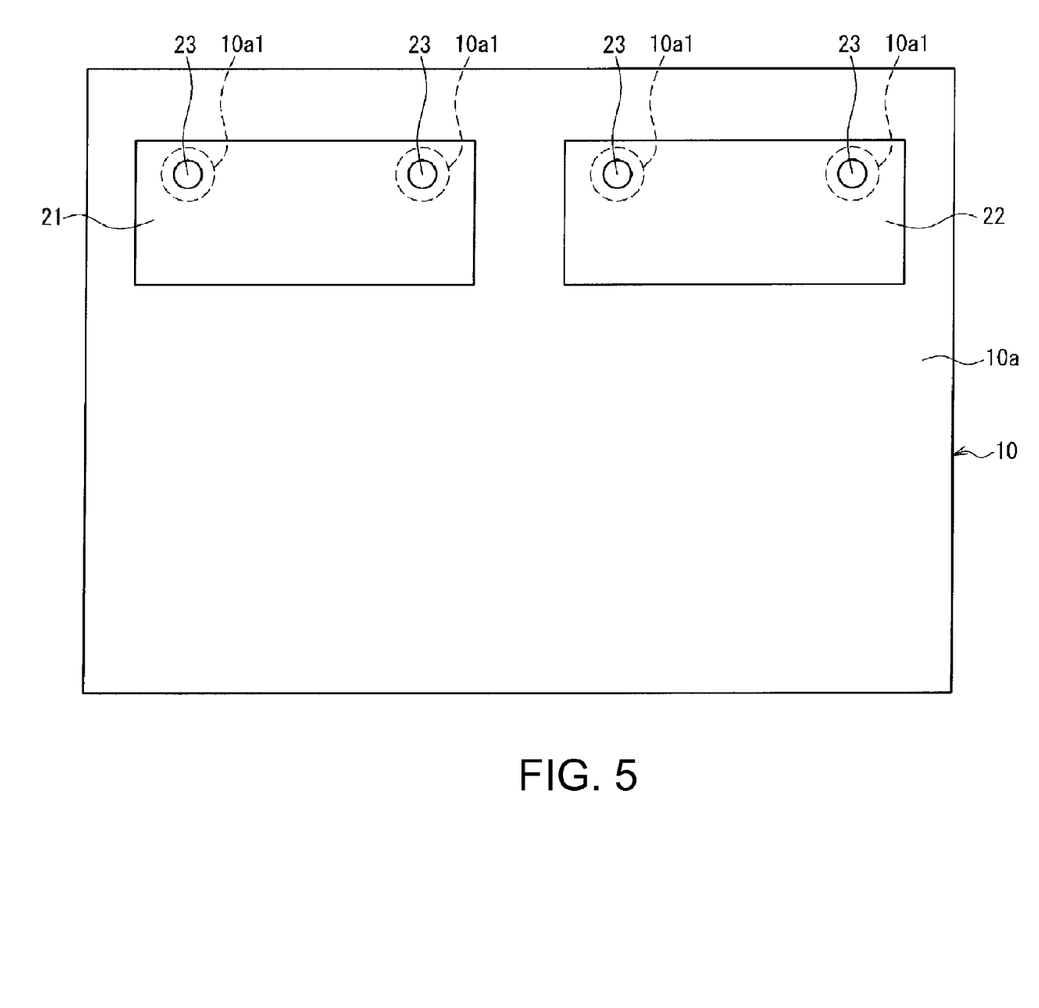
FIG. 5 is a plan view showing a specific configuration example of the rear surface of the casing of the backlight device shown in FIG. 2.
Figure 6:
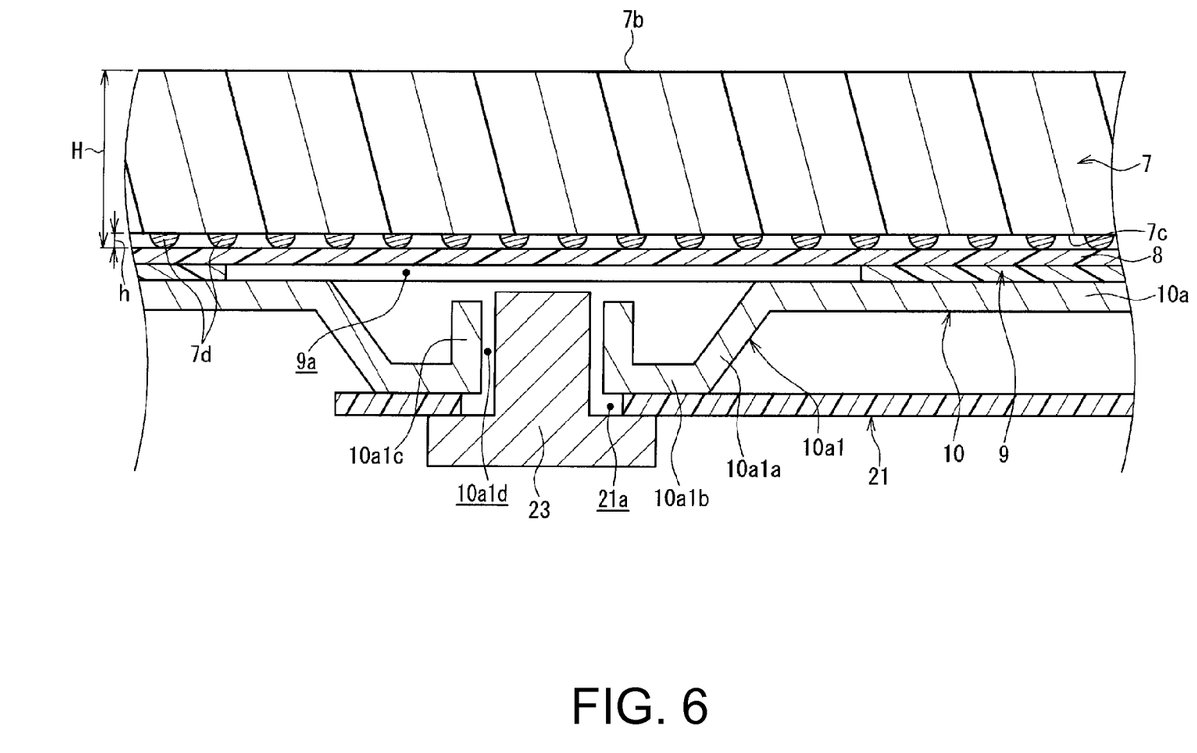
FIG. 6 is an expanded cross-sectional view showing main components of the backlight device.
Figure 7:
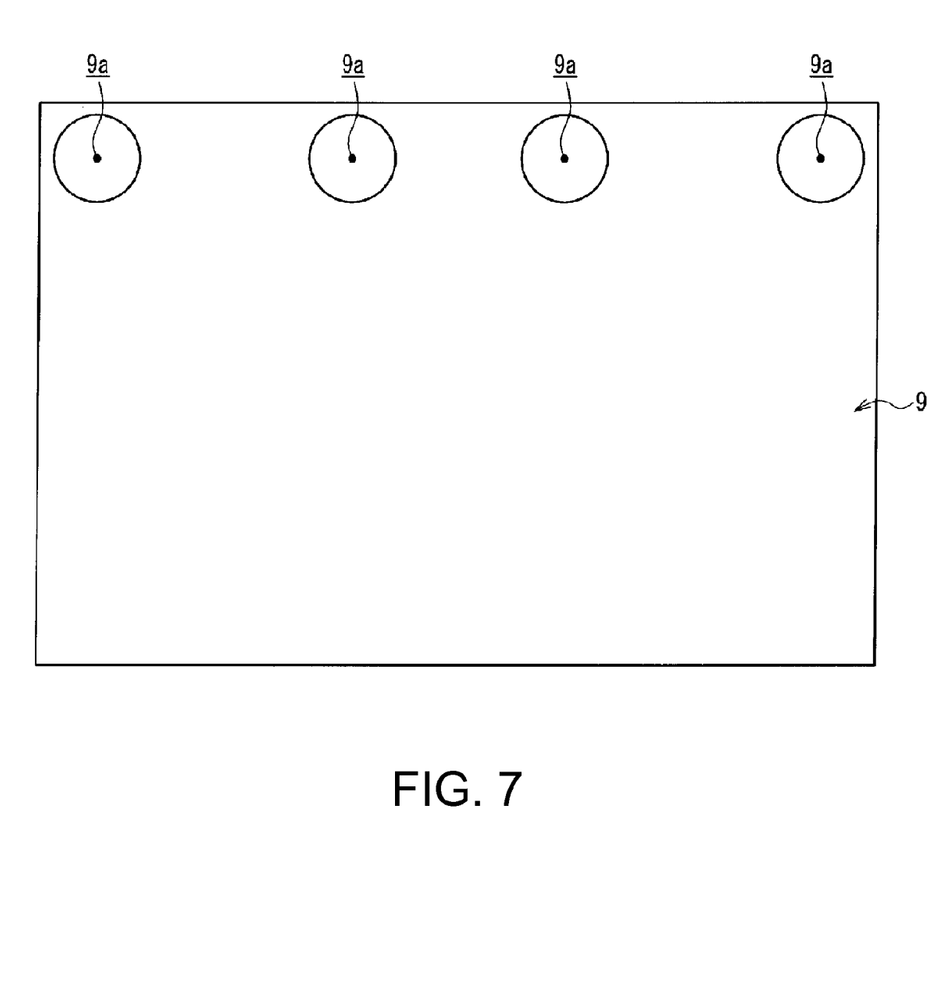
FIG. 7 is a plan view showing a configuration of a cushioning member shown in FIG. 2.

FIG. 4 is a plan view showing the backlight device shown in FIG. 2 as seen from the liquid crystal panel side. FIG. 5 is a plan view showing a specific configuration example of the rear surface of the casing of the backlight device shown in FIG. 2. FIG. 6 is an expanded cross-sectional view showing main components of the backlight device. FIG. 7 is a plan view showing a configuration of a cushioning member shown in FIG. 2.

First, a basic configuration of the backlight device 3 of the present embodiment will be explained in detail using FIGS. 2 and 4.

As shown in FIGS. 2 and 4, the backlight device 3 of the present embodiment is provided with light emitting diodes 5 as light sources, LED substrates 6 as light source substrates on which the light emitting diodes 5 are mounted, and a light guide plate 7 on which light from the light emitting diodes 5 is incident. White color (W) light emitting diodes that emit white colored light are used for the light emitting diodes 5. In the backlight device 3 of the present embodiment, as shown in FIG. 4 as an example, two LED substrates 6 are used, and a plurality, 8, for example, of the light emitting diodes 5 are arrayed in a straight line on each LED substrate 6 at prescribed gaps from each other.

A compound resin such as a transparent acrylic resin is used for the light guide plate 7, for example, and light from the light emitting diodes (light sources) 5 enters the light guide plate 7. In other words, two side faces of the light guide plate 7 that oppose each other function as light entering faces 7*a* where light from the respective light emitting diodes 5 enter. The light guide plate 7 is also configured such that the light from the light emitting diodes 5 that enters the light entering faces 7*a* exits towards the liquid crystal panel 2 from a light exiting surface 7*b* that is disposed so as to face the liquid crystal panel 2. A reflective sheet 8, for example, is disposed on the side of the light guide plate 7 that is opposite to the liquid crystal panel 2 so that the usage efficiency of light from the light emitting diodes 5 can be improved. A cushioning member 9 is integrally attached to the surface of the reflective sheet 8 that is opposite to the light guide plate 7. The reflective sheet 8 is supported by a bottom surface 10*a* of a casing 10 via the cushioning member 9 (explained in detail later).

As described in detail later, light diffusing parts that diffuse light are disposed in the light guide plate 7 on a surface that is parallel to the light exiting surface 7*b* (in other words, the surface that is opposite to the liquid crystal panel 2). This light guide plate 7 guides the light from the light emitting diodes 5 in a prescribed propagation direction (the horizontal direction in FIG. 2), while emitting light towards the liquid crystal panel (the object to be illuminated) 2, which is the object to be illuminated, from the light exiting surface 7*b*. Optical sheets 12 such as a lens sheet and diffusion sheet are provided on the liquid crystal panel 2 side (the light exiting surface 7*b* side) of the light guide plate 7. The light from the light emitting diodes 5 that has been guided inside the light guide plate 7 in the propagation direction is changed by the optical sheets 12 into the above-mentioned planar illumination light having a uniform brightness and then sent to the liquid crystal panel 2.

As shown in FIG. 2, the backlight device 3 of the present embodiment is provided with the casing 10 that has a bottom and that is open on the liquid crystal panel 2 side, and a P (plastic) chassis 11 that has a rectangular opening and that is attached to the edges of the casing 10. A metal material such as an aluminum alloy, for example, is used for the casing 10, and the casing 10 is provided with the flat plate-shaped bottom 10*a* and side faces 10*b* that are respectively set upright at the four sides of this bottom 10 with respect to the bottom 10*a*. The optical sheets 12 are disposed in the opening of the P chassis 11, and these optical sheets 12 perform tasks such as increasing the brightness of light from the light exiting surface 7*b* (FIG. 4) of the light guide plate 7, with the light then being incident on the liquid crystal panel 2.

The casing 10 houses at least the light guide plate 7, reflective sheet 8, and cushioning member 9, and the cushioning member 9, reflective sheet 8, and light guide plate 7 are sequentially placed on the bottom 10*a*. In the casing 10, a squeezing part 10*a*1, which is a part having prescribed recesses and protrusions, is disposed on the bottom 10*a*, and this bottom 10*a* functions as an opposing surface.

Next, with reference to FIGS. 5 to 7, the configuration of main components of the backlight device 3 of the present embodiment will be explained.

As shown as an example in FIG. 5, in the backlight device 3 of the present embodiment, the back side (the side opposite to the liquid crystal panel 2) of the bottom 10*a* of the casing 10 has two printed circuit substrates 21 and 22 attached thereto. Electronic components such as an IC for driving the liquid crystal panel 2 (in other words, electronic components included in the image processing part 14*a* and frame buffer 14*b*) are mounted (not shown) on the printed circuit substrate 21. Electronic components for driving the backlight device 3 (electronic components that form the lighting driving circuits of the light emitting diodes 5, for example) are mounted (not shown) on the printed circuit substrate 22.

These printed circuit substrates 21 and 22 are attached to the bottom 10*a* by the squeezing part 10*a*1 and screws 23 that are disposed on the bottom 10*a*. Specifically, as shown as an example in FIG. 6, the squeezing part 10*a*1 includes, with respect to the bottom 10*a*: a slanted portion 10*a*1*a* that protrudes towards the side opposite to the light guide plate 7 at a prescribed angle from the bottom 10*a*; a parallel portion 10*a*1*b* that is continuous with the slanted portion 10*a*1*a* and that is disposed so as to be parallel to the bottom 10*a*; and a cylindrical portion 10*a*1*c* that is continuous with the parallel portion 10*a*1*b* and that is formed in a cylindrical shape. This slanted portion 10*a*1*a*, parallel portion 10*a*1*b*, and cylindrical portion 10*a*1*c* are formed in concentric circles. The squeezing part 10*a*1 is formed in a circular shape above the bottom 10*a*, and a circular opening 10*a*1*d* is provided by the cylindrical portion 10*a*1*c* on the center of the squeezing part 10*a*1.

In the backlight device 3, the printed circuit board 21 is attached to the bottom 10*a* of the casing 10 by sequentially inserting the screw 23 through an opening 21*a* provided on the printed circuit substrate 21 and the opening 10*a*1*d* of the squeezing part 10*a*1.

As shown in FIG. 6, in the light guide plate 7, light diffusing parts 7*d* described above are provided on a non-light exiting surface 7*c* that is formed so as to face the light exiting surface 7*b*. These light diffusing parts 7*d* include a plurality of bumps, for example, and these plurality of bumps are formed on the non-light exiting surface 7*c* in a prescribed pattern. The bumps have an average height (shown in FIG. 6 as "h") from the non-light exiting surface 7*c* set at 20 microns or less, for example. In other words, an injection type light guide plate is used as the light guide plate 7, for example, and the plurality of bumps that form the light diffusing parts 7*d* are integrally formed with the main body of the light guide plate by injection molding.

The size of the light guide plate 7 in the direction perpendicular to the light exiting surface 7*b* thereof, namely the thickness size (shown by "H" in FIG. 6), is 0.6 mm to 4.0 mm. In other words, the light guide plate 7 has a thickness greater than or equal to the size of the light emitting parts of the light emitting diodes 5 that are arranged facing the light entering faces 7*a*, and light from the light emitting diodes 5 can efficiently enter the light guide plate 7. By using the light guide plate 7 that has a thickness of 4.0 mm or less, the backlight device 3, and by extension the liquid crystal display device 1 and television receiver Tv can be made thinner with ease.

A bump-forming process (embossing) may be applied to the non-light exiting surface 7*c* in ways other than those described above, in order to form the light diffusing parts 7*d* made of a plurality of bumps on the non-light exiting surface 7*c*. A light guide plate that is made of a transparent glass material can also be used.

In the above descriptions, the light guide plate 7 that is rectangular in a cross-sectional view and that includes a light exiting surface 7*b* and non-light exiting surface 7*c* parallel to each other was described, but the light guide plate of the present invention is not limited thereto, and a light guide plate that is wedge-shaped in a cross sectional view and that has a light exiting surface and non-light exiting surface that are at a prescribed angle with respect to each other can also be used, for example.

In FIG. 6, in the backlight device 3 of the present embodiment, the reflective sheet 8 is disposed so as to be in contact with the light diffusing parts 7*d*. The cushioning member 9 is disposed between the reflective sheet 8 and the bottom (opposing surface) 10*a* of the casing 10.

A white compound resin sheet material such as PET (polyethylene terephthalate) is used for the reflective sheet 8, for example, and the reflective sheet 8 reflects light that has leaked to outside the light guide plate 7 from the non-light exiting surface 7*c* and the light diffusing parts 7*d* back towards the light guide plate 7. This reflective sheet 8 has a size in the direction perpendicular to the bottom (opposing surface) 10*a* (in other words, a thickness size) of approximately 0.2 mm, for example.

A compound resin sheet material such as PET (polyethylene terephthalate) is used for the cushioning member 9, for example. This cushioning member 9 is formed in integration with the reflective sheet 8. In other words, the reflective sheet 8 and cushioning member 9 are bonded together using a transparent double-sided adhesive tape, a transparent adhesive, or the like (not shown). The reflective sheet 8 and cushioning member 9 may also be simply combined together without using the double-sided adhesive tape, transparent adhesive, or the like, in ways other than those described above.

As shown in FIG. 7, four circular openings 9*a* are disposed on the cushioning member 9. Each of these openings 9*a* is formed at a location corresponding to the squeezing part (the part with recesses and protrusions) 10*a*1 of the bottom (the opposing surface) 10*a*. As shown as an example in FIG. 6, each opening 9*a* is arranged above the concentric circles of the corresponding squeezing part 10*a*1 and faces the base portion of this squeezing part 10*a*1. This cushioning member 9 has a size in the direction perpendicular to the bottom (opposing surface) 10*a* (in other words, the thickness size) of 0.02 mm or greater.

The backlight device 3 of the present embodiment as configured above has the opening 9*a* of the cushioning member 9 formed at a location corresponding to the squeezing part (the part with recesses and protrusions) 10*a*1 of the bottom (opposing surface) 10*a*. In this way, in the backlight device 3 of the present embodiment, the squeezing part 10*a*1 and the base portion thereof are able to prevent the reflective sheet 8 being pushed towards the light guide plate 7, and damage to the surface of the light guide plate 7 can be prevented. As a result, in the present embodiment, a backlight device 3 that can prevent a reduction in light emitting quality can be configured even when the light guide plate 7 is made thinner, unlike in the conventional examples described above.

In the present embodiment, the reflective sheet 8 and the cushioning member 9 are formed in integration with each other, and thus, the assembly work of the backlight device 3 can be simplified with ease.

In the present embodiment, the cushioning member 9 also has a size in the direction perpendicular to the bottom 10*a* of 0.02 mm or greater, and thus, the squeezing part 10*a*1 and the base portion thereof are able to prevent the reflective sheet 8 from being pushed towards the light guide plate 7, and damage to the surface of the light guide plate 7 can be reliably prevented. Accordingly, the backlight device 3 of the present embodiment can reliably prevent a reduction in light emitting quality even if the light guide plate 7 is made thinner.

In the present embodiment, the size of the light guide plate 7 in the direction perpendicular to the light exiting surface 7*b* is 4 mm or less, and thus, the backlight device 3 can be made thinner with ease.

In the present embodiment, an injection type light guide plate is used, and thus, a low-cost light guide plate can be used. In the present embodiment, even if an injection type light guide plate, which is relatively susceptible to protrusions and recessions being formed on the surface thereof, is used, the squeezing part 10*a*1 and the base portion thereof can prevent reflective sheet 8 from being pushed towards the light guide plate 7, and damage to the surface of the light guide plate 7 can be prevented.

In the present embodiment, the light diffusing parts 7*d* of the light guide plate 7 include a plurality of bumps, and each of the plurality of bumps 7*d* have an average height from the non-light exiting surface 7*c* that is set at 20 microns or less. In this way, in the present embodiment light from the light emitting diodes (light sources) can be suitably emitted to the liquid crystal panel (the object to be illuminated) 2 even if the light guide plate 7 is made thinner.

In the present embodiment, the backlight device 3 is used that can prevent a reduction in light emitting quality even if the light guide plate 7 is made thinner, and thus, the liquid crystal display device (display device) 1 with excellent display quality and high performance and the television receiver TV can be formed with ease.

Printing such as screen printing may be performed on the non-light exiting surface 7c of the light guide plate 7 to form light diffusing parts having prescribed patterns, in ways other than those described above. The light diffusing parts can be formed with high precision when made in this way, and a reduction in the light emitting quality of the backlight device 3 can be prevented.

Embodiment 2

Figure 8:
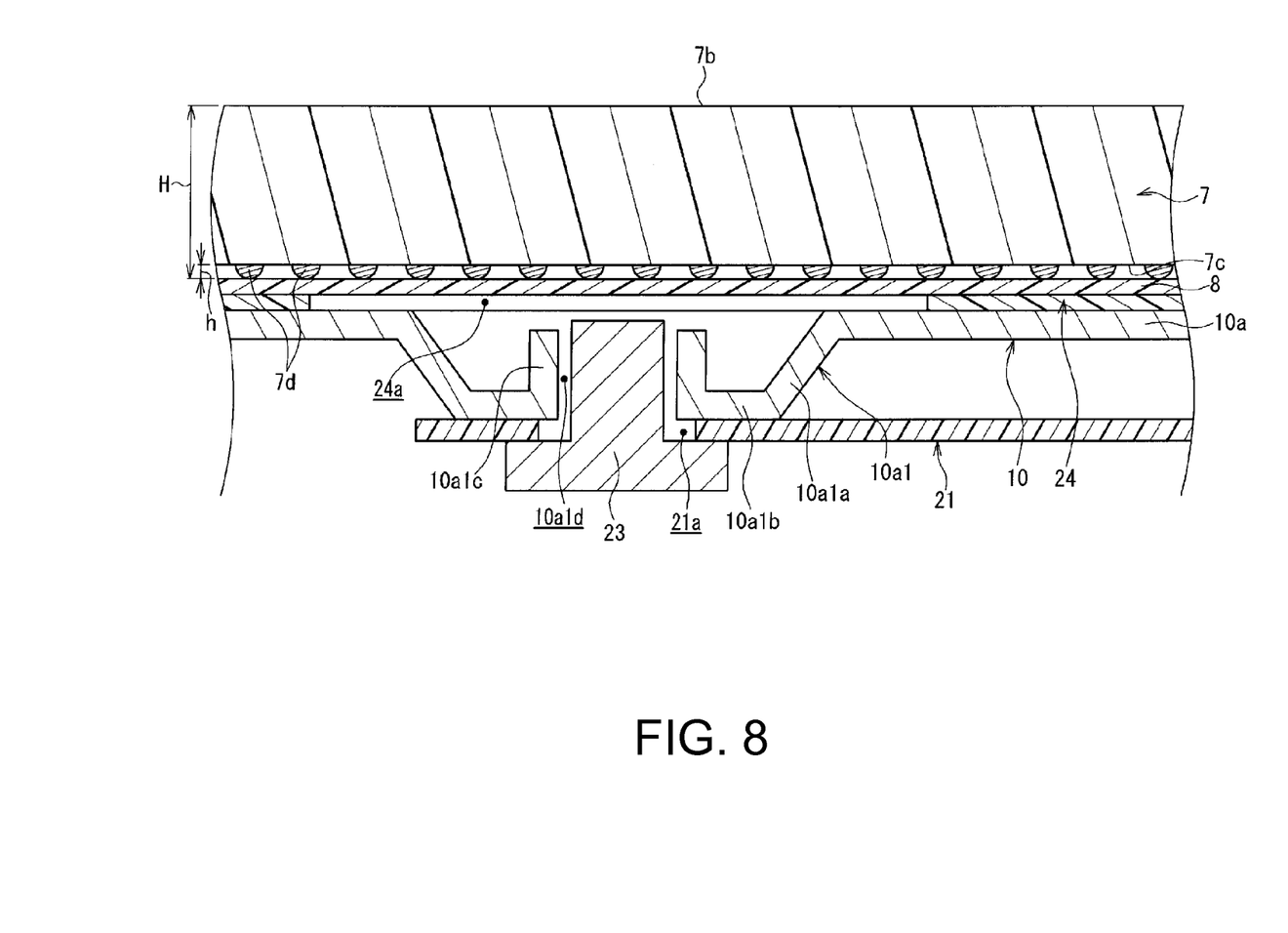
FIG. 8 is an expanded cross-sectional view showing main components of a backlight device according to Embodiment 2 of the present invention.
Figure 9:
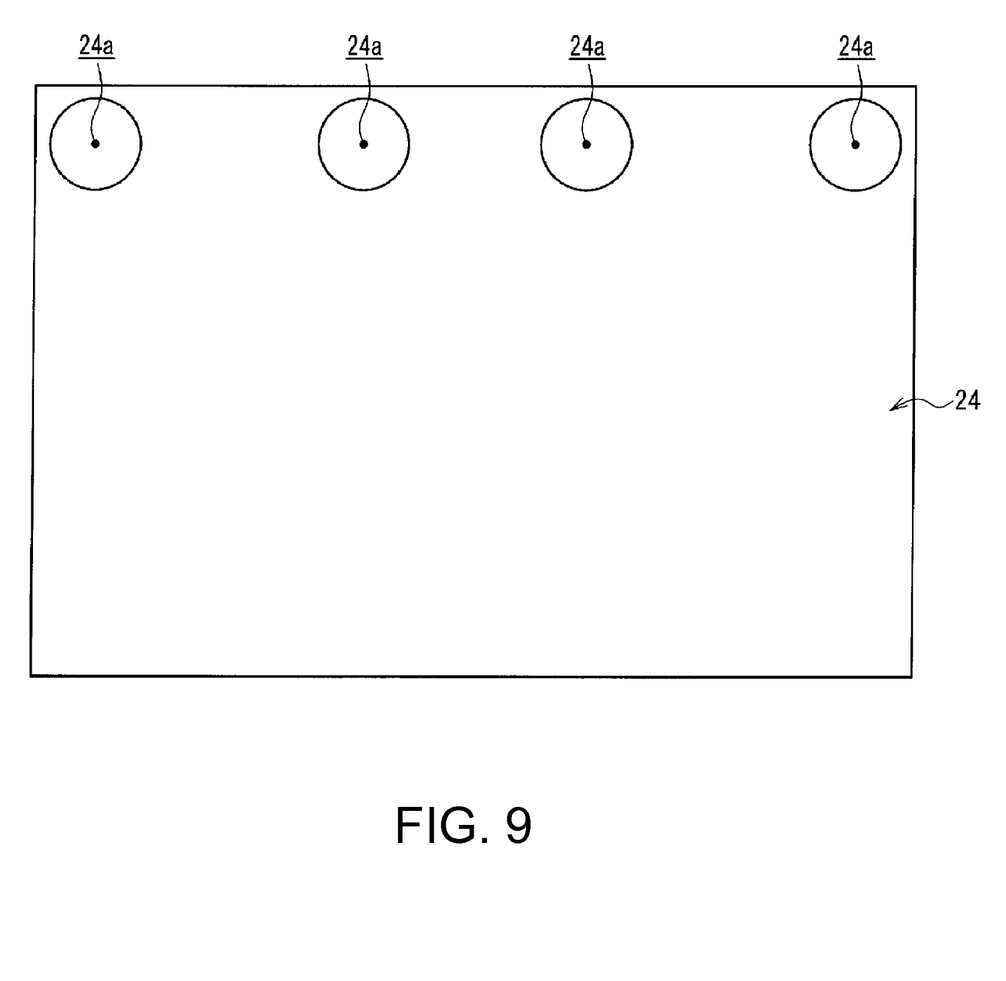
FIG. 9 is a plan view showing a configuration of a cushioning member shown in FIG. 8.

FIG. 8 is an expanded cross-sectional view showing main components of a backlight device according to Embodiment 2 of the present invention. FIG. 9 is a plan view showing a configuration of a cushioning member shown in FIG. 8. In the drawing, the main difference between the present embodiment and Embodiment 1 described above is that a cushioning member uses the same sheet material as a reflective sheet. The same reference characters are given to elements that are common with Embodiment 1 above, and duplicative descriptions are omitted.

In other words, in FIG. 8, a cushioning member 24 is disposed between a reflective sheet 8 and a bottom (opposing surface) 10a of a casing 10 in a backlight device 3 of the present embodiment. The same sheet material that is used for a reflective sheet 8 is used for this cushioning member 24, and the cushioning member 24 is formed in integration with the reflective sheet 8. In other words, the reflective sheet 8 and cushioning member 24 are bonded together using a transparent double-sided adhesive tape, a transparent adhesive, or the like (not shown). The reflective sheet 8 and cushioning member 24 may also be simply combined together without using the double-sided adhesive tape, transparent adhesive, or the like, in ways other than those described above.

As shown in FIG. 9, four circular openings 24a are disposed on the cushioning member 24. Each of these openings 24a is formed at locations corresponding to squeezing parts (a part with recesses and protrusions) 10a1 of the bottom (the opposing surface) 10a. As shown as an example in FIG. 8, each opening 24a is arranged on the concentric circles of the corresponding squeezing part 10a1 and faces the base portion of the squeezing part 10a1. This cushioning member 24 has a size in the direction perpendicular to the bottom (opposing surface) 10a (in other words, the thickness size) of 0.02 mm or greater.

With the above-mentioned configuration, in the present embodiment, functions and effects similar to those in Embodiment 1 above can be achieved. In the present embodiment, the same material is used for the reflective sheet 8 as is used for the cushioning member 24, and thus, with the cushioning member 24, light from light emitting diodes (light sources) 5 can be emitted towards a liquid crystal panel (an object to be illuminated) 2, and the brightness of the backlight device 3 can be improved. The cushioning member 24, and by extension the backlight device 3, can be manufactured with ease.

Embodiment 3

Figure 10:
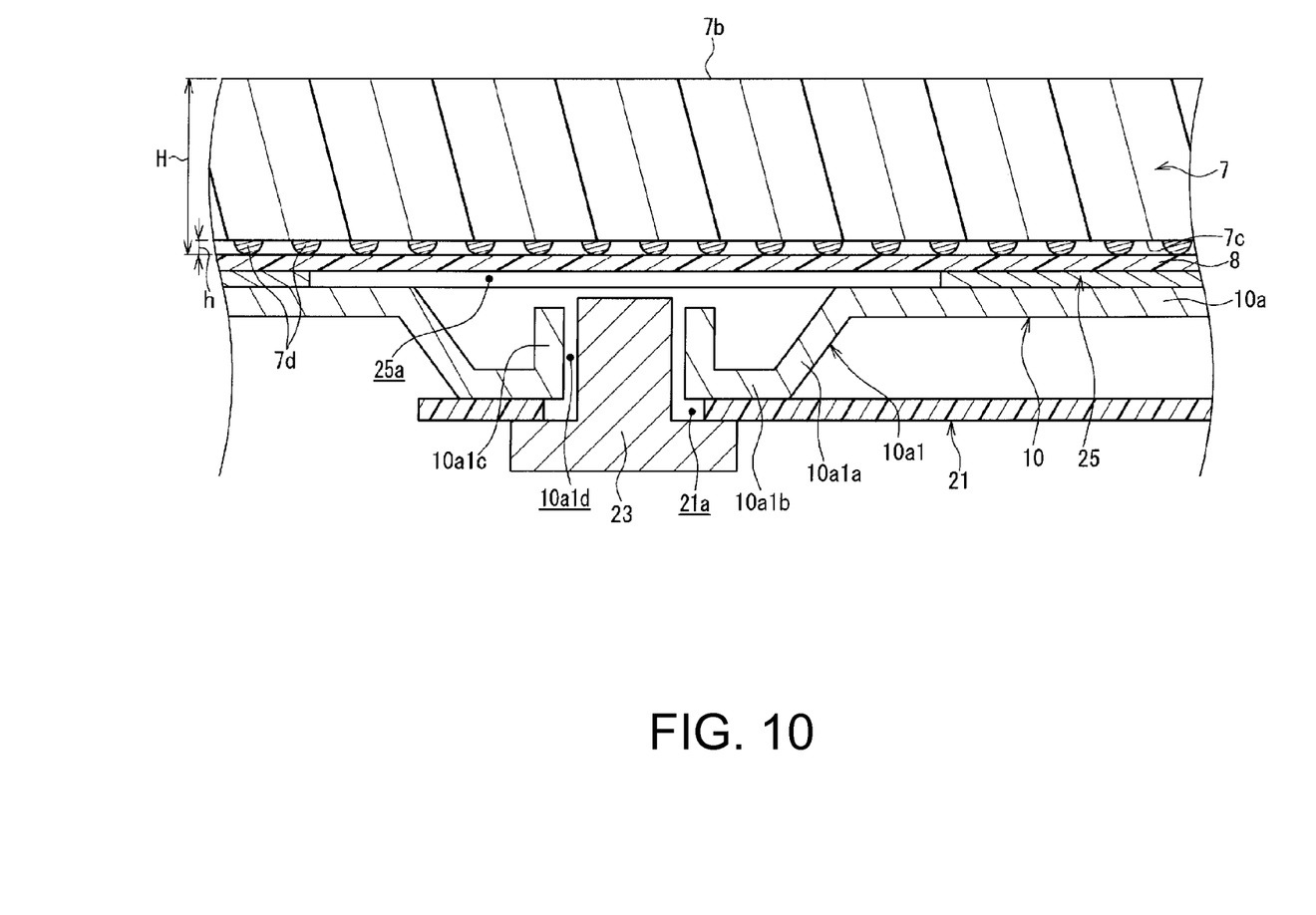
FIG. 10 is an expanded cross-sectional view showing main components of a backlight device according to Embodiment 3 of the present invention.
Figure 11:
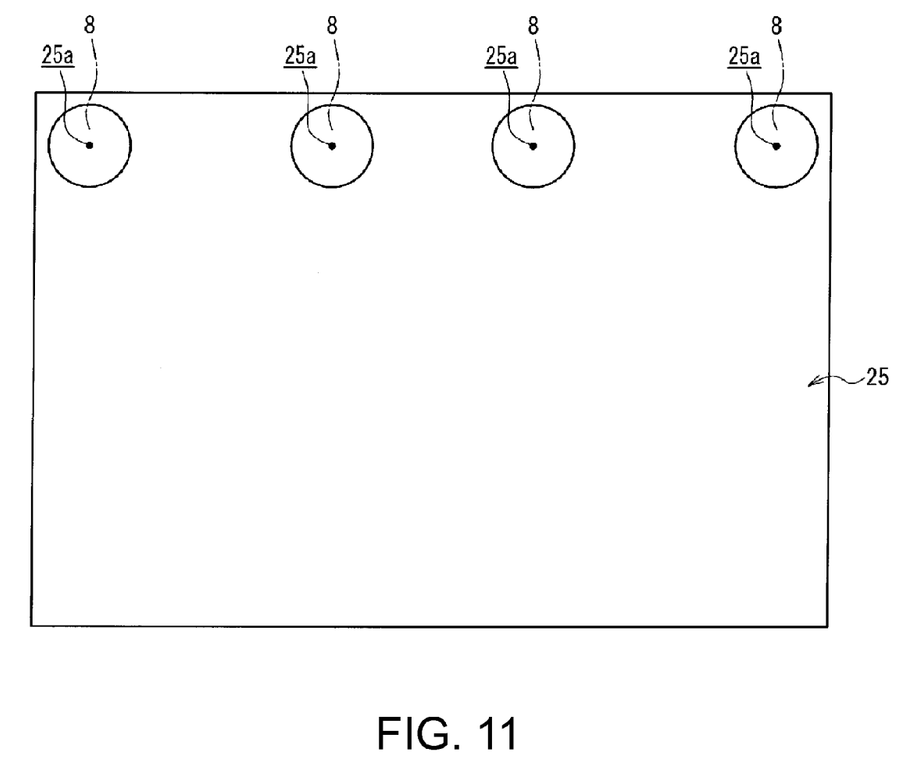
FIG. 11 is a plan view showing a configuration of a cushioning member shown in FIG. 10.

FIG. 10 is an expanded cross-sectional view showing main components of a backlight device according to Embodiment 3 of the present invention. FIG. 11 is a plan view showing a configuration of a cushioning member shown in FIG. 10. In the drawing, the main difference between the present embodiment and Embodiment 1 described above is that a cushioning member uses a metal vapor deposited film formed above a reflective sheet. The same reference characters are given to elements that are common with Embodiment 1 above, and duplicative descriptions are omitted.

In other words, in FIG. 10, a cushioning member 25 is disposed between a reflective sheet 8 and a bottom (opposing surface) 10a of a casing 10 in a backlight device 3 of the present embodiment. A metal vapor deposited film formed above the reflective sheet 8 is used for this cushioning member 25, and the cushioning member 25 is formed in integration with the reflective sheet 8. In other words, the cushioning member 25 is formed above the reflective sheet 8 by vacuum deposition on a surface of the reflective sheet 8 with a metal material such as aluminum foil.

As shown in FIG. 11, four circular openings 25a are disposed on the cushioning member 25. Each of these openings 25a is formed at a location corresponding to a squeezing part (a part with recesses and protrusions) 10a1 of the bottom (the opposing surface) 10a. As shown as an example in FIG. 10, each opening 25a is arranged on the concentric circles of the corresponding squeezing part 10a1 and faces the base portion of the squeezing part 10a1. This cushioning member 25 has a size in the direction perpendicular to the bottom (opposing surface) 10a (in other words, the thickness size) of 0.02 mm or greater.

With the above-mentioned configuration, in the present embodiment, functions and effects similar to those in Embodiment 1 above can be achieved. In the present embodiment, the metal vapor deposited film formed above the reflective sheet 8 is used as the cushioning member 25, and thus, an increase in the number of components of the backlight device 3 can be prevented, and a simplification of the assembly work for the backlight device 3 can be carried out with ease.

All of the above-mentioned embodiments are illustrative and not limiting. The technical scope of the present invention is defined by the claims, and any modifications within a scope that corresponds to the configuration stated in the claims and their equivalents are also encompassed by the present invention.

In the above descriptions, the present invention was described as being applied to a transmissive liquid crystal display device, for example, but the backlight device of the present invention is not limited thereto and can be applied to a semi-transmissive liquid crystal display device or various kinds of display devices such as a projection type display device that uses a liquid crystal panel with a light bulb.

The present invention can be suitably used in ways other than described above, such as with a film viewer that illuminates an x-ray photo or with a light box for making photographic negatives or the like easy to see by illuminating them, or as a backlight device of a light emitting device that provides lighting for advertisements or the like that are arranged on billboards, station walls, or the like.

In the descriptions above, the backlight device of the present invention was described as having a plurality of light emitting diodes (light sources) arranged facing two opposite side faces of the light guide plate, but the backlight device of the present invention is not limited thereto, and may be a backlight device in which light sources are arranged facing a single side face of a light guide plate, for example. A plurality of rows of light sources may be arranged facing a single side face of the light guide plate.

In the above descriptions, the opposing surface being formed by the bottom of the casing was described, but the opposing surface of the present invented is not limited thereto and has no restrictions as long as the opposing surface is disposed to face the reflective sheet on the side of the reflective sheet opposite to the light guide plate and is formed with prescribed recesses and protrusions.

However, it is more preferable to have a configuration in which the opposing surface is formed by the bottom of the casing, as in each embodiment above, due to the ease of being able to form a compact backlight device with a low number of parts.

In the above descriptions, the squeezing part that is disposed on the bottom of the casing and that is for attaching the printed circuit substrates to the casing was described as an example of a part with recesses and protrusions, but a part with recesses and protrusions of the present invention is not limited thereto and has no restrictions as long as this part has a shape that protrudes towards the reflective sheet and/or the opposite side of the reflective sheet. The part with recesses and protrusions may be a protrusion-shaped engaging part that protrudes from the bottom of the casing towards the back cabinet in order to engage the casing and the back cabinet of the television receiver, for example.

In the above descriptions, a white light emitting diode was described as being used as a light source, but the light source of the present invention is not limited thereto, and a discharge tube such as a cold cathode fluorescent lamp or hot cathode fluorescent lamp, a lamp such as a light bulb, or a light emitting element such as organic EL (electronic luminescence) or an inorganic EL element can be used as the light source, for example.

However, it is more preferable to use a light emitting diode as the light source, as in each embodiment above, due to the ability to form a backlight device having lower power consumption and excellent environmental characteristics with ease.

The light emitting diode of the present invention is not restricted to the above-mentioned white light-emitting diode, and a so-called 3-in-1 type light emitting diode that is an integrated RGB light emitting diode, or a so-called 4-in-1 type light emitting diode that is an integrated light emitting diode with RGBW, GRGB, or the like, or a light emitting diode that has separate colored light emitting diodes for R, G, and B, respectively, can be used, for example.

INDUSTRIAL APPLICABILITY

The present invention is useful for a backlight device that can prevent a reduction in light emitting quality even if a light guide plate is made thinner, a display device that uses this backlight device, and a television receiver.

DESCRIPTION OF REFERENCE CHARACTERS 1 liquid crystal display device (display device)
2 liquid crystal panel (object to be illuminated)
3 backlight device
5 light emitting diode (light source)
7 light guide plate
7b light exiting surface
7c non-light exiting surface
7d light diffusing part
8 reflective sheet
9, 24, 25 cushioning member
9a, 24a, 25a opening
10 casing
10a bottom (opposite surface)
10a1 squeezing part (part with recesses and protrusions)
Tv television receiver

The invention claimed is:

1. A backlight device, comprising:
a light source;
a light guide plate that guides light from the light source in a prescribed propagation direction and that emits the light to an object to be illuminated;
a reflective sheet that is disposed on a side of the light guide plate that is opposite to the object to be illuminated and that reflects light from the light guide plate back towards the light guide plate;
an opposing surface that is arranged so as to oppose the reflective sheet on a side of the reflective sheet that is opposite to the light guide plate, the opposing surface having prescribed recesses and protrusions formed thereon; and
a cushioning member that is arranged between the reflective sheet and the opposing surface,
wherein an opening is formed in the cushioning member at locations corresponding to the recesses and protrusions,
wherein the light guide plate has a light exiting surface that emits light to the object to be illuminated, and a non-light exiting surface that is opposite to the light exiting surface and that has light diffusing parts formed thereon that diffuse light, and
wherein the light guide plate has a size in a direction perpendicular to the light exiting surface of 4 mm or less.

2. The backlight device according to claim 1,
wherein a sheet material that is used as the cushioning member is the same sheet material as the reflective sheet.

3. The backlight device according to claim 1,
wherein the reflective sheet and the cushioning member are formed in integration with each other.

4. The backlight device according to claim 1,
wherein a metal vapor deposited film formed above the reflective sheet is used as the cushioning member.

5. The backlight device according to claim 1,
wherein the cushioning member has a thickness of 0.02 mm or greater in a direction perpendicular to the opposing surface.

6. The backlight device according to claim 1,
wherein an injection type light guide plate is used as the light guide plate.

7. The backlight device according to claim 1,
wherein the light diffusing parts in the light guide plate include a plurality of bumps, and
wherein each of the plurality of bumps has an average height from the non-light exiting surface of 20 microns or less.

8. The backlight device according to claim 1,
wherein the light diffusing parts in the light guide plate are formed by performing printing on the non-light exiting surface.

9. The backlight device according to claim 1,
wherein a casing is provided that houses at least the light guide plate, the reflective sheet, and the cushioning member, and
wherein the opposing surface is formed by a bottom of the casing.

10. The backlight device according to claim 1,
wherein a light emitting diode is used as the light source.

11. A display device, comprising the backlight device according to claim 1.

12. A television receiver, comprising the display device according to claim 11.

13. A backlight device, comprising:

a light source;

a light guide plate that guides light from the light source in a prescribed propagation direction and that emits the light to an object to be illuminated;

a reflective sheet that is disposed on a side of the light guide plate that is opposite to the object to be illuminated and that reflects light from the light guide plate back towards the light guide plate;

an opposing surface that is arranged so as to oppose the reflective sheet on a side of the reflective sheet that is opposite to the light guide plate, the opposing surface having prescribed recesses and protrusions formed thereon; and a cushioning member that is arranged between the reflective sheet and the opposing surface, wherein an opening is formed in the cushioning member at locations corresponding to the recesses and protrusions, wherein the light diffusing parts in the light guide plate include a plurality of bumps, and wherein each of the plurality of bumps has an average height from the non-light exiting surface of 20 microns or less.

14. A backlight device, comprising:

a light source;

a light guide plate that guides light from the light source in a prescribed propagation direction and that emits the light to an object to be illuminated;

a reflective sheet that is disposed on a side of the light guide plate that is opposite to the object to be illuminated and that reflects light from the light guide plate back towards the light guide plate;

an opposing surface that is arranged so as to oppose the reflective sheet on a side of the reflective sheet that is opposite to the light guide plate, the opposing surface having prescribed recesses and protrusions formed thereon; and a cushioning member that is arranged between the reflective sheet and the opposing surface, wherein an opening is formed in the cushioning member at locations corresponding to the recesses and protrusions, and wherein the light diffusing parts in the light guide plate are formed by performing printing on the non-light exiting surface.

* * * * *